Patented Feb. 10, 1953

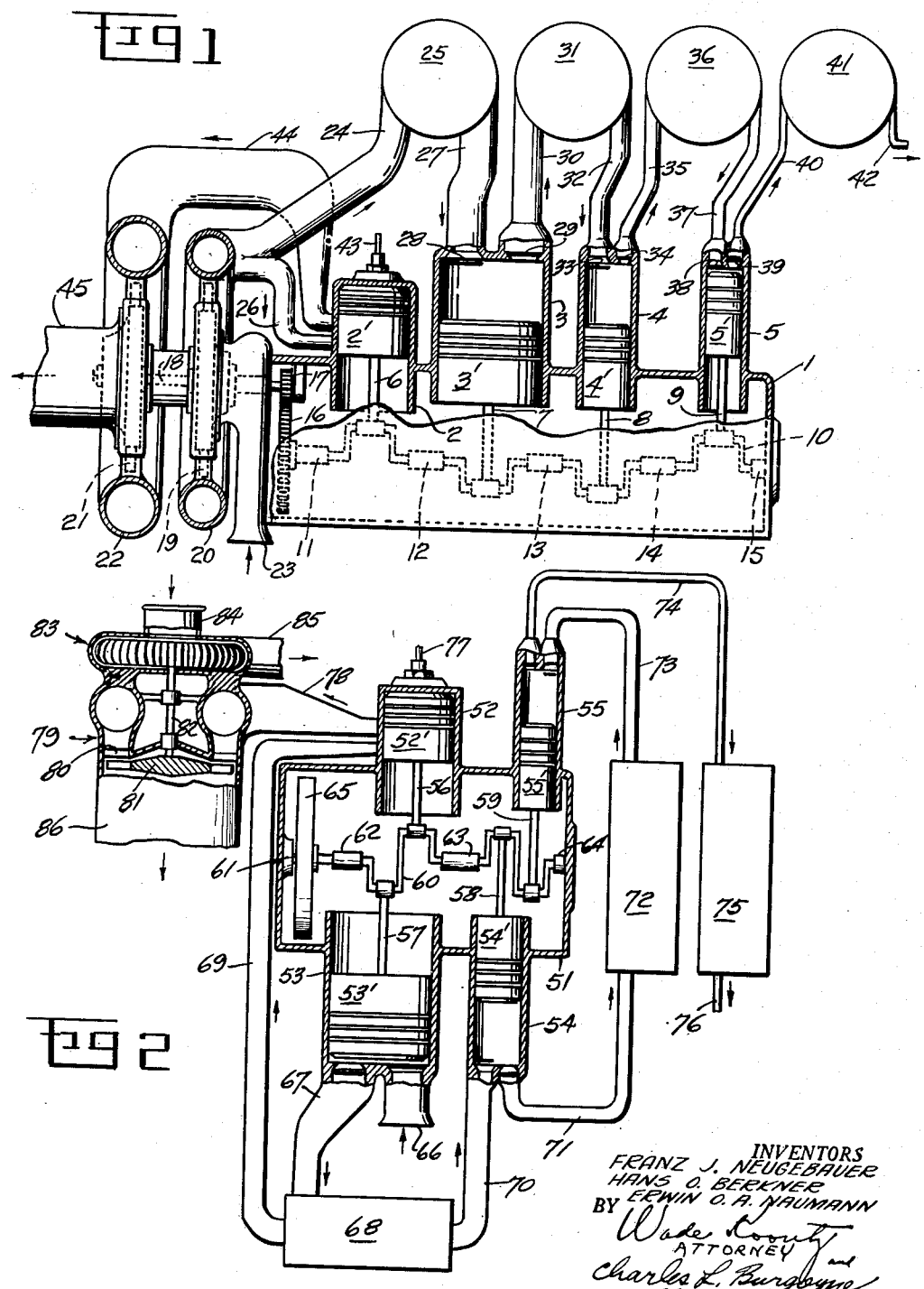

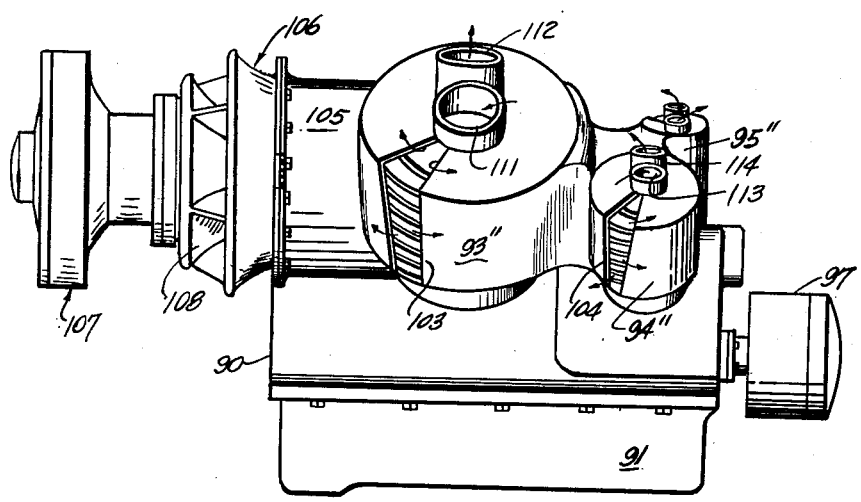

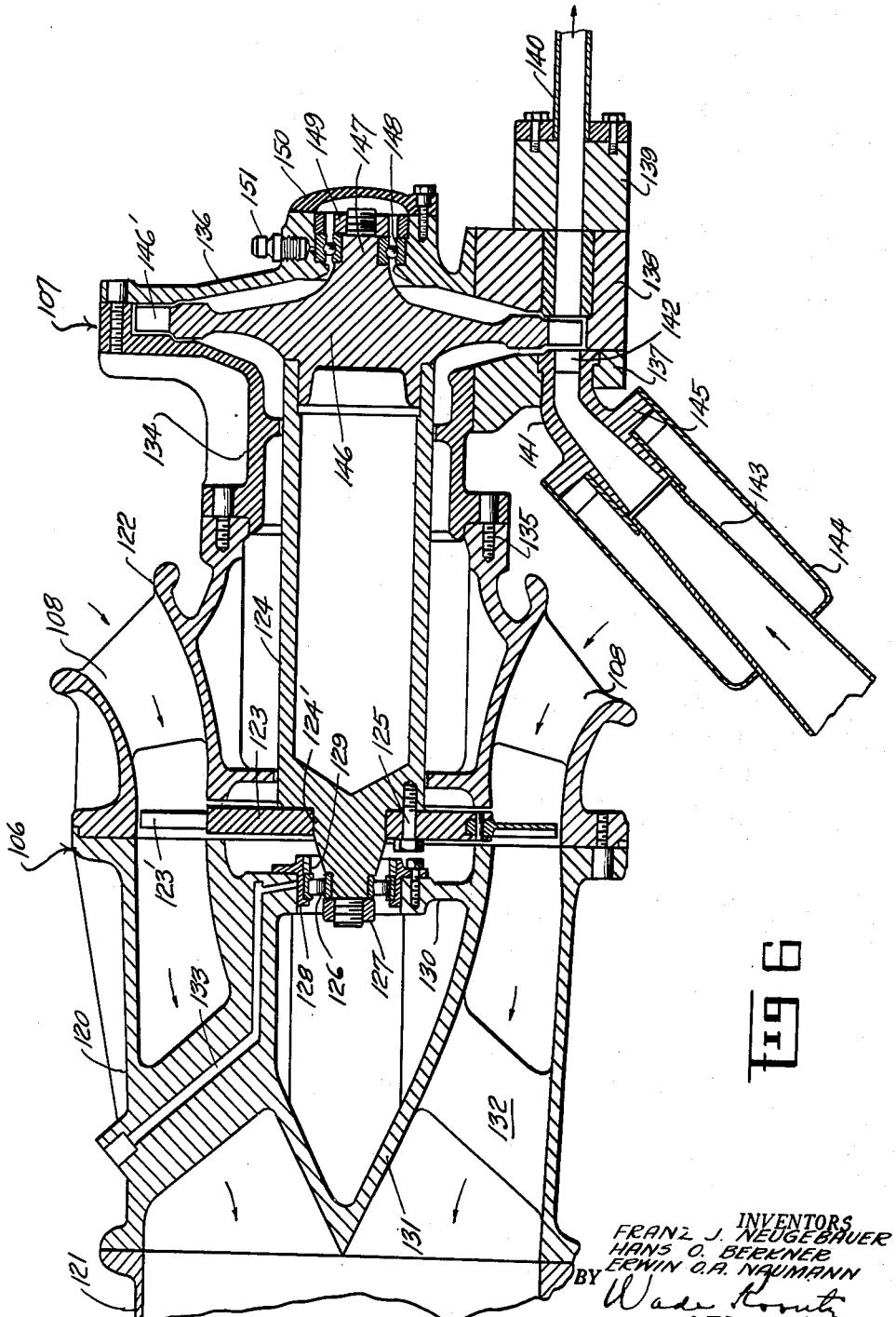

2,628,015

UNITED STATES PATENT OFFICE 2,628,015

ENGINE-DRIVEN AIR COMPRESSOR

Franz J. Neugebauer, Dayton, Hans O. Berkner, Wood City, and Erwin O. A. Naumann, Dayton, Ohio Application November 9, 1949, Serial No. 126,421

6 Claims. (Cl. 230—56)

(Granted under Title 35, U. S. Code (1952), sec. 266)

The invention described herein may be manufactured and used by or for the United States Government for governmental purposes without payment to us of any royalty thereon.

The present invention relates to an engine driven air compressor.

The primary object of the invention is to provide an engine driven air compressor in which the first compressor stage is either of the reciprocating piston type or the centrifugal type and made sufficiently oversize to deliver first stage compressed air as well as ample amounts of air for supercharging and scavenging the engine cylinder or cylinders.

A further object of the invention is to provide an engine driven air compressor the crankshaft of which is directly geared to an exhaust turbine operated by the flow of exhaust gas from the compressor engine.

Another object of the invention is to provide an engine driven air compressor including a turbine driven blower fixed to the compressor to supply cooling air for the cylinders of the engine and compressor and cooling air for the intercoolers and after-cooler on the compressor and wherein the blower turbine is operated by the flow of exhaust gas from the compressor engine.

Another object of the invention is to provide an engine driven air compressor in which the cylinders of the compressor and the cylinder or cylinders of the engine are arranged en-bloc and are supplied with cylinder cooling air by means of a common air distributing duct or tunnel.

Another object of the invention is to provide a compact and efficient blower and turbine unit having a short and sturdy drive shaft between the turbine and blower.

The above and other objects of the invention will become apparent upon reading the following detailed description in conjunction with the accompanying drawings, in which:

Fig. 1 is a schematic cross sectional view through an engine driven air compressor including a centrifugal compressor stage and further including an exhaust turbine directly connected to the centrifugal compressor unit.

Fig. 2 is a schematic cross sectional view through an engine driven air compressor including an exhaust turbine directly connected to a blower for the cylinders of the engine and compressor and for the intercoolers and aftercooler.

Fig. 3 is a side elevation view of the exterior of an air compressor corresponding to that illustrated in Fig. 2.

Fig. 4 is a transverse cross sectional view taken through the engine cylinder and first compressor cylinder of an engine driven air compressor.

Fig. 5 is a transverse cross sectional view taken through the high pressure cylinders of an engine driven air compressor and illustrating a tandem arrangement of cylinders which may be used in some compressors.

Fig. 6 is a longitudinal cross sectional view taken through a combined exhaust turbine and blower unit which may be used in the present engine driven air compressors.

The first embodiment of the present engine driven air compressor as shown in Fig. 1 includes a crankcase 1 having fixed thereto a series of cylinders 2, 3, 4 and 5. The cylinder 2 is a diesel engine cylinder to furnish power in conjunction with the reciprocating piston 2' for operating the air compressor. The cylinders 3, 4 and 5 are interconnected air compressing cylinders to furnish compressed air at the outlet of the last cylinder 5. Compression of air in these cylinders is accomplished by the associated pistons 3', 4' and 5'. The four pistons 2' to 5' inclusive are operated by connecting rods 6, 7, 8 and 9 and the crankshaft 10. The shaft 10 is supported in main bearings 11, 12, 13, 14 and 15 and at the forward or engine end of the shaft there is provided a gear wheel 16 driving a spur gear 17 which is in turn fixed to a shaft 18. The shaft 18 is in turn fixed to the impeller 19 of a centrifugal air compressor 20 and to the rotor 21 of expansion gas turbine 22. In practice the housing portions of compressor 20 and turbine 22 are secured directly to the crankcase 1, or these housing portions may be mounted on a base or foundation also carrying the crankcase 1. By providing a gear reduction from the shaft 18 to the shaft 10, the high speed expansion turbine 22 may be coupled to the slower speed diesel engine including cylinder 2 and piston 2'.

The use of a centrifugal first compressor stage, as in Fig. 1, results in appreciable power saving where the compressor capacity is high, that is over 250 cubic feet per minute of free air intake. Therefore the engine driven compressor of Fig. 1 is of the high capacity type. Here it is seen that the free air intake conduit 23 carries air to the central air inlet of the compressor unit 20 and the conduit 24 carries air under partial compression to the first intercooler 25. A branch pipe 26 carries a portion of first stage compressed air to the diesel cylinder 2 for cylinder scavenging. A conduit 27 carries cooled, compressed air from intercooler 25 to the first air compression cylinder 3. An air inlet valve 28 allows first stage compressed air to pass into the cylinder 3 on the downstroke of the piston 3', since the inlet valve responds to the pressure difference between the compressed air on one side and the reduced pressure in the cylinder during suction stroke. The cylinder now fills with first stage compressed air and on compression stroke of the piston 3', the air is further compressed to close the inlet valve 28 and open the outlet valve 29, whereby the second stage compressed air flows by way of conduit 30 into the second intercooler 31. The pressure responsive inlet and outlet valves found on all the cylinder heads are of the conventional spring-closed type and the details thereof are not important to a disclosure of the present invention. These valves respond to a pressure difference from inlet to outlet sides in order to open momentarily and allow high pressure air to flow toward a space or conduit containing air at a lower pressure. On compression stroke of a piston the air trapped in the head end of the cylinder reaches a higher maximum pressure than that in the cylinder outlet conduit, thus opening the outlet valve long enough to further charge the intercooler with more high pressure air.

The compressed air after being cooled in the intercooler 31 flows by way of conduit 32 and inlet valve 33 to the cylinder 4 for the third stage compression. As may be seen, the cylinders 3, 4 and 5 are progressively smaller in diameter because the air volume being handled decreases in direct proportion to the increase in pressure. On compression of air in cylinder 4 the outlet valve 34 responds to allow third stage compressed air to flow through conduit 35 into the third stage intercooler 36. From intercooler 36 the compressed air flows by conduit 37 and inlet valve 38 into cylinder 5, and after compression therein the air at the final pressure flows by way of outlet valve 39 and conduit 40 to the aftercooler 41. The final compressed air product may flow by pipe 42 to the point where it will be used. The relative stroke positions of the four pistons 2', 3', 4' and 5' is preferably determined by their relative weight and position fore-and-aft of the compressor, in order to achieve good dynamic balance. Thus there is no objection to consecutive pistons, such as 3' and 4', reaching the stroke limits simultaneously, since the intercoolers and connecting pipes have a substantial air capacity to provide compressed air reservoirs between air compression stages. The intercoolers and aftercooler may have any desired structure but the air cooled types are usually preferred. The compressed air passages and cooling air passages are provided with heat transfer fins, with the greater fin surface exposed to low pressure cooling air because of its lower density and lower heat transfer coefficient. Just by way of example the compressor of Fig. 1 may be designed with a compression ratio of about 2 to 1 in the first stage and 5 to 1 in the other stages to give a final highly compressed air suitable for use in testing pressure-tight apparatus or in actuating various pressure-responsive devices. The air pressures available at various stages may be tabulated for example as follows:

Table I

| | P. s. i. absolute |
|---|---|
| First stage compression | 30 |
| Second stage compression | 150 |
| Third stage compression | 750 |
| Fourth stage compression | 3750 |

In order to obtain gage pressures corresponding to each of the figures it is merely necessary to subtract 14.7 from each pressure figure. As will be explained in connection with the V-type compressor of Figs. 3 to 5, the various cylinders may be air cooled to prevent serious overheating thereof.

Power to drive the air compressor of Fig. 1 is obtained from a two-cycle diesel cylinder or engine 2 and an exhaust turbine 22. These prime movers are geared together and power from one may augment that from the other and the resulting power flow will be made smoother thereby. The diesel cylinder is connected by a tube 43 to a fuel pump and fuel supply, in order to inject fuel in timed relation with the piston movements. Thus when the piston 2' approaches the top of its compression stroke, a small amount of fuel oil is injected into the clearance space where it becomes ignited by the heat of compression. The resulting combustion process pushes the piston down past the exhaust ports, whereby the exhaust gases may flow in conduit 44 to the exhaust turbine 22. As the piston 2' reaches the limit of its exhaust or scavenging stroke, the ports leading to the compressed air conduit 26 open and first stage compressed air flows across the cylinder and displaces a major portion of the combustion gases into the exhaust conduit 44, at the same time feeding a new charge of air into the cylinder for combustion of the next fuel charge. The exhaust gases operate the rotor 21 of the expansion turbine 22 and leave by way of the centrally located exhaust stack 45. It is of course understood that the exhaust turbine 22 generates only a fraction of the horsepower of that produced by the diesel engine 2; for instance with a 40 horsepower engine the turbine 22 may be made to produce about 6 horsepower under favorable circumstances.

The second embodiment of the present engine-driven air compressor as shown in Fig. 2 includes a crankcase 51 having fixed thereto a series of cylinders 52, 53, 54 and 55. The cylinder 52 is a diesel engine cylinder to furnish power in conjunction with the reciprocating piston 52' for operating the air compressor. The cylinders 53, 54 and 55 are interconnected air compressing cylinders to furnish compressed air at the outlet of the last cylinder, or even between compressor stages if a lower pressure air is more desirable. Compression of air in the cylinders is accomplished by the associated pistons 53', 54' and 55'. The four pistons 52' to 55' inclusive are operated by connecting rods 56, 57, 58 and 59 and the crankshaft 60. The shaft 60 is supported in main bearings 61, 62, 63 and 64 and is rigidly connected to the flywheel 65.

The first stage in the compression process is of the piston-type and therefore the compressor of Fig. 2 will preferably be of the low capacity, that is the first stage will draw less than 250 cubic feet per minute of free air at the intake 66. Air compressed in cylinder 53 passes by way of conduit 67 into the first stage intercooler 68 but part of this first stage compressed air also flows by conduit 69 to the diesel cylinder 52 for supercharging and scavenging the cylinder on the exhaust stroke. The cooled air from the first intercooler passes by way of conduit 70 to the second compressor cylinder 54 for further compression therein, and then passes on by conduit 71 to the second stage intercooler 72. The cooled air from the second intercooler passes by way of conduit 73 to the third compressor cylinder 55 for further compression therein, and then passes on by conduit 74 to the aftercooler 75 before flowing by pipe 76 to the point where the finally compressed air will be used. By way of example the compressor of Fig. 2 may be designed with a compression ratio of about 2 to 1 in the first stage and of 6 to 1 in the other stages. The air pressures available at various stages may be tabulated for example as follows:

*Table II*

|  | P. s. i. absolute |
|---|---|
| First stage compression | 30 |
| Second stage compression | 180 |
| Third stage compression | 1080 |

The diesel engine including cylinder 52 and piston 52' is of the two-cycle type as in Fig. 1 and liquid fuel is supplied thereto by way of fuel line 77. Exhaust gases leaving the cylinder 52 flow along the conduit 78 to an expansion turbine 79 including inlet guide vanes 80 adjacent to the turbine roto 81 whereby the turbine rotates and supplies power by shaft 82 to turn the blower 83 having air intake 84 and air outlet 85. The turbine exhaust flows to the atmosphere by exhaust stack 86 after giving up a large part of its kinetic energy to the expansion turbine 79. As in the first described embodiment of the invention, the first air compressor stage furnishes engine cylinder supercharging and scavenging air as well as the first stage compressed air to the second air compressor stage. The air from blower 83 is employed to cool the cylinders of the engine and compressor and also to cool the intercoolers and aftercooler, as will be described more in detail below with reference to Figs. 3 to 6 of the drawings.

A more specific and detailed illustration of the invention is shown in Figs. 3 to 6 of the drawings. The engine driven air compressor of these views corresponds most nearly to the system or arrangement of Fig. 2 but is also quite similar to the arrangement of Fig. 1. In Fig. 3 there is shown an engine driven air compressor having the cylinders angularly disposed on opposite sides of the central vertical plane, to provide what may be termed a V-type machine. The crankcase 90 including an attached pan 91 has rigidly secured therein four cylinders 92, 93, 94 and 95 (see Figs. 4 and 5). The cylinder 92 is the diesel engine unit or component, while the cylinders 93, 94 and 95 are air compressor cylinders. There is also shown in Fig. 5 an additional or fourth compressor cylinder 96 working in tandem with the second compressor cylinder 94 but adapted to receive compressed air from the third compressor cylinder 95. Secured on one end of the crankcase and geared to the compressor crankshaft is a starter unit 97 intended for operation only to start the diesel engine portion of the air compressor. This unit may be similar to the starter as found on automobile and marine engines.

The pistons 92', 93', 94', 95' and 96' in the various cylinders are caused to operate through the customary connecting rods mounted on the crankshaft 98. This shaft is mounted to rotate in the main bearings of the machine and the shaft is counterweighted to balance the weight of the pistons, piston rods and crank pins. Each of the cylinders is provided with integrally connected cooling fins as shown to provide an extensive surface in heat transfer relation with cooling air reaching the cylinders by way of a central duct, passage or tunnel 99 communicating with cylinder jackets 92'', 93'', 94'', 95'' and 96'' through openings in the jackets on the sides adjacent to the passage 99. The cooling air after passing around the finned cylinders leaves the cylinder jackets by way of exhaust openings, as indicated at 103 and 104 in Fig. 3. The cooling air passage 99 extends from an air inlet manifold 105 (Fig. 3) having the outlet end of a blower or compressor 106 secured thereto. The compressor 106 is driven by an exhaust turbine 107 receiving exhaust gases from the diesel cylinder 92. Outside air enters the blower or compressor 106 by way of an annular series of passages 108, has its pressure boosted in the blower 106 and then passes directly into the cooling air manifold 105. A portion of the cooling air is piped from the manifold 105 through the tubular intercoolers and aftercooler before being exhausted to the atmosphere.

The diesel cylinder or engine 92 performs its compressor driving function in the same way as previously described and thereby powers the compressor including cylinders 93 to 96 inclusive. Fuel oil enters the diesel cylinder by way of tube 110 and is injected in time with the piston movements so as to enter the engine cylinder at about the moment the piston reaches upper dead center. While the fourth compressor cylinder 96 is not shown in Fig. 3, it may be used where very high pressure air is required as a final product. The input thereto will be received from the third stage cylinder 95 after first passing through an intercooler. The fourth stage piston 96' may be coupled in tandem relation with the second stage piston 94' by means of an interconnecting strut 109 (Fig. 5).

Except for the coupled blower and turbine 106 and 107 the operation of the compressor of Figs. 3 to 5 will be described and its similarity to the system of Fig. 2 will be apparent. There being four stages of compression including the small tandem stage 96, the pressures at each stage may follow the pattern outlined in Table I for example. Free air enters the cylinder 93 by way of the intake stack 111 and the customary spring closed inlet valves. After compression the first stage compressed air leaves the cylinder 93 by way of outlet valves and a conduit 112 connected to the first stage intercooler, while a portion of this first stage air is also conducted to the scavenging port or ports 92a of diesel cylinder 92. First stage compressed air from the intercooler then enters the second stage cylinder 94 at 113 and after compression leaves at 114 on its way to the second stage intercooler. The cooled and compressed air now flows by way of inlet passage 115 to the third stage cylinder 95 and leaves by outlet passage 116 to flow to the third stage intercooler. This third stage compressed air now flows to the fourth stage cylinder 96 by way of inlet passage 117 and leaves by outlet passage 118 for flow to the aftercooler and to the conduits carrying cooled and compressed air to the point where it will be used. The engine exhaust gases leave the cylinder by way of the port or ports indicated at 92b and thence flow to the exhaust turbine 107 for driving the turbine and connected blower.

The exhaust turbine and coupled blower for furnishing cylinder and intercooler cooling air is shown in detail in Fig. 6, although it should be understood that this longitudinal cross section shows only one example of such a unit or auxiliary. The blower includes a cylindrical housing 120 adapted for connection at one end to an outlet manifold 121 and at the other end to an air inlet and housing section 122. An annular air inlet at the outer sides of the section 122 is divided up into a series of air inlet passages 108, leading to the blades 123' of an air impeller or fan 123. The impeller is centrally apertured and secured around a hub portion 124' of a hollow main shaft 124 by means of screws 125. The axially extending end of hub 124' fits within an antifriction roller bearing assembly 126 and the inner race of the bearing assembly is retained in place by the nut 127. The outer bearing race fits within a ring 128 and is retained therein by a suitable retainer 129. This roller bearing assembly is required to carry only radial loads, thrust loads being taken care of by another bearing at the other end of the rotating assembly. The ring 128 is held rigidly within a central web portion 130 rigid with respect to a tapered filler block 131 joined to the housing 120 by thin struts 132. An oil passage 133 extends through one strut 132 to the bearing assembly 126, whereby an occasional oil or grease shot may be conducted to the bearing assembly. The expansion turbine 107 includes a housing section 134 fastened to the air inlet and housing section 122 by means of screws 135. The outer end of the section 134 is closed by a cover plate 136. Gas inlet and outlet sections 137 and 138 are secured to the members 134 and 136 and form only a minor portion of the peripheral outline of this portion of the structure. An exhaust section 139 secured to section 138 carries the exhaust gases to an exhaust pipe 140 leading to the free atmosphere. Secured in the gas inlet section 137 is a nozzle 141 having inlet guide vanes 142 for directing the hot exhaust gases onto several rotor blades simultaneously. Secured to the free end of the nozzle 141 is a tapering exhaust lead-in pipe 143, which is surrounded by a jacket member 144 secured to the outer flange 145 of nozzle member 141. The air space between pipe 143 and jacket 144 keeps the jacket cooler than the pipe and prevents undesirable heating of air entering the adjacent air inlet passage 108. It is clear also that if desired insulating material such as mineral wool or asbestos may be placed within the jacket 144 to further insulate the corresponding section of pipe 143.

Rigidly mounted on the hollow shaft 124 is a turbine rotor 146 having blades or vanes 146' on the periphery thereof, against which is directed the hot exhaust gases flowing past guide vanes 142. The rotor has a hub portion 147 extending into an antifriction bearing assembly 148. The bearing assembly is retained on hub 147 by means of a nut 149 and a cover plate 150 encloses the bearing and the retaining nut. A lubricating fitting 151 permits grease to be injected into the bearing periodically. The bearing assembly 148 using a series of antifriction ball elements therein serves to carry radial as well as all the thrust loads developed in the rotating assembly. As will be apparent the exhaust gases strike only a small portion of all the turbine blades simultaneously, but due to the relatively low volume of exhaust gases flowing the inlet nozzles are not extended clear around the turbine.

The ball bearing assembly 148 maintains the turbine rotor 146 in properly spaced relation with respect to the guide vanes 142, while the roller bearing assembly 126 at the other end of the shaft permits lengthwise expansion of the hollow shaft which carries the air impeller or fan 123. As seen in Fig. 6 the inner race of the roller bearing assembly has no limiting shoulders to prevent endwise displacement of the shaft and race. The shaft 124 reaches an appreciably higher temperature than the turbine housing, so therefore the lengthwise expansion of the shaft is greater than that of the housing. Thus by having the turbine end of the main shaft relatively fixed against endwise expansion, any axial displacement is limited to portions of the shaft and the air impeller 123. The latter can not interfere with any adjacent parts, since the impeller blades do not cooperate with any nearby blading or other elements. The annular series of air inlet passages merge into a clear annular air passage within which the impeller blades 123' move freely. It is possible in certain designs of the turbine and blower unit that the main shaft 124 will expand linearly to a less extent than the housing, depending on heat conduction through certain parts as well as on the kind of materials used in different parts of the unit. Some metals have greater or lesser temperature coefficient of expansion than others. In spite of this inversion of expansion characteristics the differences of expansion of the housing and shaft will be taken care of by the bearing arrangement above described.

In the principal forms of the invention as shown in Figs. 1 to 5 the engine and compressor cylinders are arranged en-bloc for greater compactness and general convenience but it should be understood that the engine and the compressor may be built up as separate units to be mounted on a common base plate with their respective crankshafts coupled together. In these various forms of the invention the crankshaft may be a unitary rigid structure as shown or it may comprise two coupled crankshaft elements. In either case the shaft or shafts may be termed a common crankshaft for the engine and compressor.

The embodiments of the invention herein shown and described are to be regarded as illustrative only and it is to be understood that the invention is susceptible of variations, modifications and changes within the scope of the appended claims.

We claim:

1. An engine driven air compressor comprising, at least one engine cylinder and one or more compressor cylinders each having reciprocably mounted therein individual pistons, a common crankshaft interconnecting said pistons, means providing a first air compressor stage connected to said cylinders supplying compressed air to the compressor cylinders in an initially compressed condition and simultaneously supplying additional compressed air to the engine cylinder for supercharging the engine, an expansion turbine connected to said engine cylinder and operable by means of a flow of exhaust gases from the engine, and power transmission means interconnecting said common crankshaft, said means providing a first air compressor stage and said expansion turbine, whereby all useful power from said engine and said turbine is applied to the work of compressing air.

2. An engine driven air compressor comprising, at least one engine cylinder and one or more compressor cylinders each having reciprocably mounted therein individual pistons, a common crankshaft interconnecting said pistons, a centrifugal air compressor connected to the compressor cylinders in an initially compressed condition for supplying compressed air thereto and also connected to the engine cylinder, simultaneously supplying additional compressed air to the engine cylinder for supercharging the same, an expansion turbine connected to the engine cylinder and operable by means of a flow of exhaust gases from the engine, and power transmission means connected between said expansion turbine and said centrifugal air compressor.

3. An engine driven air compressor comprising, at least one engine cylinder and one or more compressor cylinders each having reciprocably mounted therein individual pistons, a common crankshaft interconnecting said pistons, a centrifugal air compressor connected to said cylinders for supplying compressed air to the compressor cylinders in an initially compressed condition and simultaneously supplying additional compressed air to the engine cylinder for supercharging the same, an expansion turbine connected to said engine cylinder and operable by means of a flow of exhaust gases from the engine, shaft means directly connecting said expansion turbine to said centrifugal air compressor, and means gearing said shaft means to said common crankshaft so as to cause operation of said shaft means at a higher speed than said crankshaft.

4. An engine driven air compressor comprising, at least one engine cylinder and one or more compressor cylinders all mounted in a common crankcase and each having reciprocably mounted therein individual pistons, a common crankshaft interconnecting said pistons, a series of conduits connecting said compressor cylinders in series or compound relation, and conduit means connecting the outlet of the first of said compressor cylinders to the engine cylinder for supercharging the same.

5. An engine driven air compressor comprising, at least one engine cylinder and one or more compressor cylinders all mounted in a common crankcase and arranged with the cylinders in a pair of lengthwise rows with the cylinders of one row extending at an angle to the cylinders of the other row, a piston reciprocably mounted in each cylinder with a common crankshaft interconnecting said pistons, a cooling air distributing duct located between said rows of cylinders, cooling air distributing jackets around said cylinders and receiving air directly from said duct, each of said jackets being open at one point remote from said duct to allow escape of air after it has passed around the cylinders, a blower secured to said air distributing duct with the blower outlet directly communicating with said duct, an expansion turbine operable by means of exhaust gases from the engine, and power transmission means connected between said turbine and said blower.

6. An engine driven air compressor comprising at least one engine cylinder and compressor cylinders, each having reciprocably mounted therein individual pistons, a common crankshaft interconnecting said pistons, means providing a first air compressor stage having an outlet operatively connected to said engine cylinder and compressor cylinders whereby first stage compressed air may be simultaneously carried to the compressor cylinders and to the engine cylinder.

FRANZ J. NEUGEBAUER.
HANS O. BERKNER.
ERWIN O. A. NAUMANN.

REFERENCES CITED

The following references are of record in the file of this patent:

UNITED STATES PATENTS

| Number | Name | Date |
|---|---|---|
| 1,816,737 | Moss | July 28, 1931 |
| 1,934,880 | Pyk et al. | Nov. 14, 1933 |
| 2,281,821 | Balmer | May 5, 1942 |
| 2,321,097 | Mills | June 8, 1943 |
| 2,364,013 | Waseige | Nov. 28, 1944 |
| 2,373,780 | Ricardo | Apr. 17, 1945 |
| 2,480,095 | Buchi | Aug. 23, 1949 |
| 2,487,532 | Eastman | Nov. 8, 1949 |